United States Patent
Baker et al.

(10) Patent No.: US 11,534,992 B2
(45) Date of Patent: Dec. 27, 2022

(54) TOOLING ASSEMBLY AND ASSOCIATED SYSTEM AND METHOD FOR MANUFACTURING A POROUS COMPOSITE STRUCTURE

(71) Applicant: The Boeing Company, Chicago, IL (US)

(72) Inventors: Tara Kovacs Baker, Charleston, SC (US); William L. Serencsits, Charleston, SC (US); Holly J. Thomas, Charleston, SC (US)

(73) Assignee: The Boeing Company, Chicago, IL (US)

( * ) Notice: Subject to any disclaimer, the term of this patent is extended or adjusted under 35 U.S.C. 154(b) by 262 days.

(21) Appl. No.: 16/291,300

(22) Filed: Mar. 4, 2019

(65) Prior Publication Data

US 2020/0282603 A1 Sep. 10, 2020

(51) Int. Cl.
*B29C 70/54* (2006.01)
*B29C 33/00* (2006.01)
(Continued)

(52) U.S. Cl.
CPC .......... *B29C 70/54* (2013.01); *B29C 33/0033* (2013.01); *B29C 70/46* (2013.01); *B29C 70/548* (2013.01); *B29C 33/046* (2013.01); *B29C 2793/0045* (2013.01); *B32B 3/12* (2013.01); *B32B 3/266* (2013.01); *B32B 5/12* (2013.01); *B32B 5/26* (2013.01); *B32B 2605/00* (2013.01)

(58) Field of Classification Search
None
See application file for complete search history.

(56) References Cited

U.S. PATENT DOCUMENTS 3,700,067 A 10/1972 Dobbs et al.
4,379,101 A 4/1983 Smith
(Continued)

FOREIGN PATENT DOCUMENTS

FR 2 929 165 10/2009
FR 2 999 970 6/2014

OTHER PUBLICATIONS

Machine English translation of FR2929165, Accessed May 14, 2021 (Year: 2008).*

(Continued)

*Primary Examiner* — Francisco W Tschen
*Assistant Examiner* — Adrianna N Konves
(74) *Attorney, Agent, or Firm* — Walters & Wasylyna LLC (57) ABSTRACT

A tooling assembly for manufacturing a porous composite structure. The tooling assembly includes a first tooling member and a second tooling member. The first tooling member includes a first body that defines a first internal volume and a first inlet. The first inlet is fluidly coupled with the first internal volume. The first tooling member also includes a first tooling surface that defines a plurality of first perforations that are fluidly coupled with the first internal volume. The second tooling member includes a second body that defines a second internal volume and a second inlet. The second inlet is fluidly coupled with the second internal volume. The second tooling member also includes a second tooling surface that defines a plurality of second perforations that are fluidly coupled with the second internal volume.

24 Claims, 11 Drawing Sheets

(51) Int. Cl.
  *B29C 70/46* (2006.01)
  *B32B 3/12* (2006.01)
  *B32B 3/26* (2006.01)
  *B32B 5/12* (2006.01)
  *B32B 5/26* (2006.01)
  *B29C 33/04* (2006.01)

(56) References Cited

U.S. PATENT DOCUMENTS

| | | |
|---|---|---|
| 4,609,519 A | 9/1986 | Pichard et al. |
| 5,268,055 A | 12/1993 | Bales et al. |
| 2008/0314516 A1* | 12/2008 | Albright ................ B29C 70/44 |
| | | 156/330 |
| 2015/0030803 A1 | 1/2015 | Butler et al. |
| 2017/0021590 A1* | 1/2017 | Jennings ................ E04C 2/16 |

OTHER PUBLICATIONS

European Patent Office, "Communication pursuant to Article 94(3) EPC," App. No. 20 160 804.9 (dated May 4, 2021).
European Patent Office, Extended European Search Report, App. No. 20160804.9 (dated Aug. 3, 2020).
English translation of FR2999970.
English translation of FR2929165.
European Patent Office, "Communication pursuant to Article 94(3) EPC," App. No. 20 160 804.9 (dated Mar. 7, 2022).

\* cited by examiner

TOOLING ASSEMBLY AND ASSOCIATED SYSTEM AND METHOD FOR MANUFACTURING A POROUS COMPOSITE STRUCTURE

FIELD

This application relates to porous composite structures and, more particularly, to a tooling assembly, system and method for manufacturing porous composite structures.

BACKGROUND

Acoustically treated composite structures reduce sound by scattering or absorbing sound energy. Due to this sound attenuating capability, acoustically treated composite structures have been used in various industries, including the aerospace industry. For example, acoustically treated composite structures are commonly incorporated into bypass gas turbine aircraft engines, such as into the inlet inner barrels, fan duct walls and/or exhaust nozzles, to attenuate the noise associated with high volume airflows.

Conventional acoustically treated composite structures include sandwich structures having a septumized honeycomb core, a perforated facesheet and an impermeable facesheet. The perforations defined by the perforated facesheet fluidly couple the cavities of the septumized honeycomb core with the ambient environment. Therefore, when air flows across the perforated facesheet, the cavities in the core act as Helmholtz resonators and attenuate the sound of the associated airflow. More specifically, core walls between adjacent cavities in the core act as acoustic septa to attenuate the sound of the airflow.

Septumized honeycomb cores, however, are expensive and processes for bonding facesheets to the cores can require multiple cure cycles. Further, current processes for perforating composite structures are typically time-intensive and are associated with high material costs. For example, abrasive perforation can have a significant cycle time, have complex tooling, and/or require a considerable amount of cleanup. Mechanical drilling can have a significant cycle time, have a recurring cost of drill bit replacements, and/or result in the cutting of fibers (which diminishes the strength of the facesheet). Drilling cycle time can be extensive for large acoustic panels with millions of perforations. Plastic pin mats can also be used to create perforations, but they are non-reusable and are thus formed to contour and trimmed to size for one-time usage.

Accordingly, those skilled in the art continue with research and development in the field of acoustically treated composite structures.

SUMMARY

Disclosed is a tooling assembly for manufacturing a porous composite structure. The tooling assembly includes a first tooling member and a second tooling member configured to hold a green layup, a fluid movement device configured to move fluid through the layup, and a manifold system configured to distribute the fluid as the fluid moves through the layup.

Also disclosed is a tooling assembly that includes a first tooling member and a second tooling member. The first tooling member includes a first body that defines a first internal volume and a first inlet. The first inlet is fluidly coupled with the first internal volume. The first tooling member also includes a first tooling surface that defines a plurality of first perforations that are fluidly coupled with the first internal volume. The second tooling member includes a second body that defines a second internal volume and a second inlet. The second inlet is fluidly coupled with the second internal volume. The second tooling member also includes a second tooling surface that defines a plurality of second perforations that are fluidly coupled with the second internal volume.

Also disclosed is a system for manufacturing a porous composite structure. The system includes a tooling assembly having a first tooling member and a second tooling member. The first tooling member includes a first body that defines a first internal volume and a first inlet. The first inlet is fluidly coupled with the first internal volume. The first tooling member also includes a first tooling surface that defines a plurality of first perforations that are fluidly coupled with the first internal volume. The second tooling member includes a second body that defines a second internal volume and a second inlet. The second inlet is fluidly coupled with the second internal volume. The second tooling member also includes a second tooling surface that defines a plurality of second perforations that are fluidly coupled with the second internal volume. The system further includes a layup positioned between the first tooling surface of the first tooling member and the second tooling surface of the second tooling member.

Also disclosed is a method for manufacturing a porous composite structure.

In one example, the disclosed method includes positioning a green layup between a first tooling surface and a second tooling surface, wherein the first tooling surface includes a plurality of first perforations and the second tooling surface includes a plurality of second perforations, and establishing a flow of fluid through the plurality of first perforations, through the layup, and through the plurality of second perforations.

In another example, the disclosed method includes positioning a layup between the first tooling surface of the first tooling member of a tooling assembly and the second tooling surface of the second tooling member of the same tooling assembly. The first tooling member includes a first body that defines a first internal volume and a first inlet. The first inlet is fluidly coupled with the first internal volume. The first tooling member also includes a first tooling surface that defines a plurality of first perforations that are fluidly coupled with the first internal volume. The second tooling member includes a second body that defines a second internal volume and a second inlet. The second inlet is fluidly coupled with the second internal volume. The second tooling member also includes a second tooling surface that defines a plurality of second perforations that are fluidly coupled with the second internal volume. The method further includes establishing a flow of fluid from the first tooling member into the second tooling member wherein the fluid flows through the first perforations, through the layup and through the second perforations.

Also disclosed is a method for forming a plurality of tortuous paths in a green layup that includes a plurality of plies, each ply of the plurality of plies including reinforcing fibers embedded in a resin matrix, the method including (1) supporting the layup and (2) while the layup is supported, flowing fluid through the layup to displace at least some of the resin matrix, thereby forming said plurality of tortuous paths in the layup.

Various examples of the disclosed tooling assembly, system, method for manufacturing a porous composite structure, and method for forming a plurality of tortuous paths in a green layup will become apparent from the following detailed description, the accompanying drawings and the appended claims.

DETAILED DESCRIPTION

The following detailed description refers to the accompanying drawings, which illustrate specific examples described by the disclosure. Other examples having different structures and operations do not depart from the scope of the present disclosure. Like reference numerals may refer to the same feature, element, or component in the different drawings.

Illustrative, non-exhaustive examples, which may be, but are not necessarily, claimed, of the subject matter according the present disclosure are provided below. Reference herein to "example" means that one or more feature, structure, element, component, characteristic and/or operational step described in connection with the example is included in at least one embodiment and/or implementation of the subject matter according to the present disclosure. Thus, the phrases "an example," "some examples," and similar language throughout the present disclosure may, but do not necessarily, refer to the same example. Further, the subject matter characterizing any one example may, but does not necessarily, include the subject matter characterizing any other example.

Figure 1:
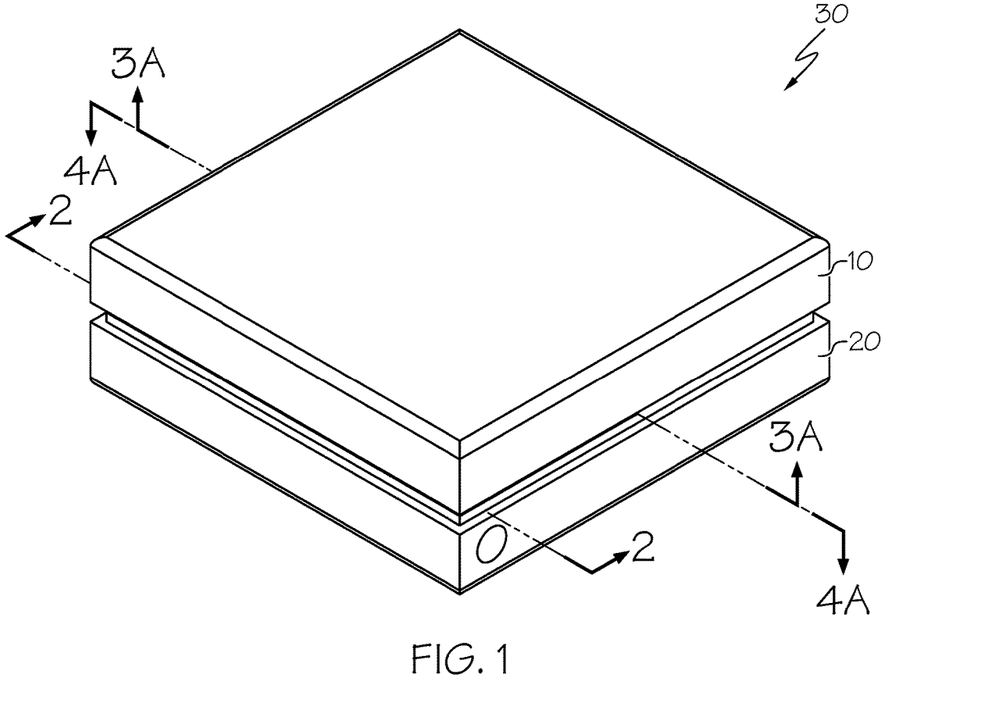
FIG. 1 is a perspective view of one example of the disclosed tooling assembly.

Referring to FIG. 1, illustrated is a perspective view of a tooling assembly 30 constructed in accordance with an example. The tooling assembly 30 includes a first tooling member 10 opposed from a second tooling member 20. Both the first tooling member 10 and the second tooling member 20 may be similarly sized and shaped to evenly correspond with one another.

Figure 2:
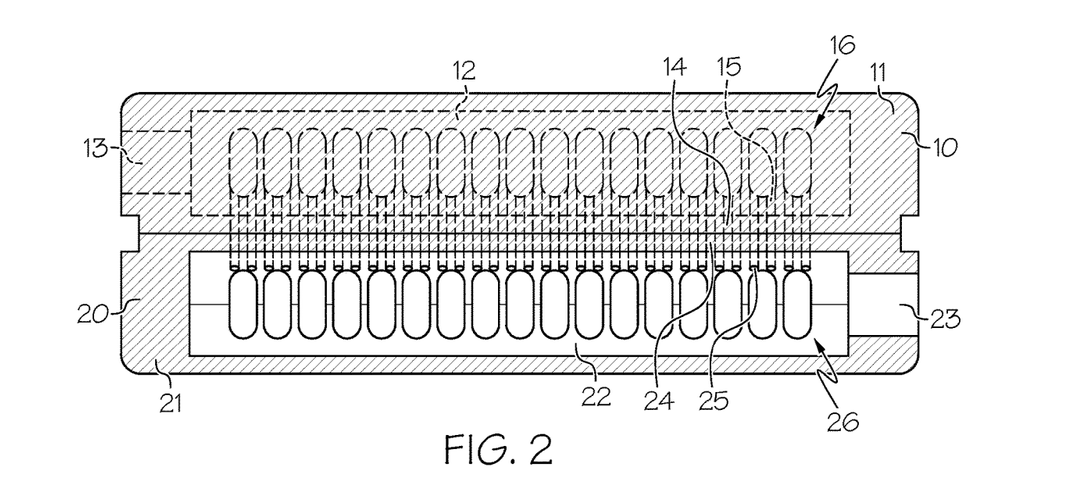
FIG. 2 is a side elevational view, in cross-section, of the tooling assembly of FIG. 1.
Figure 3A:
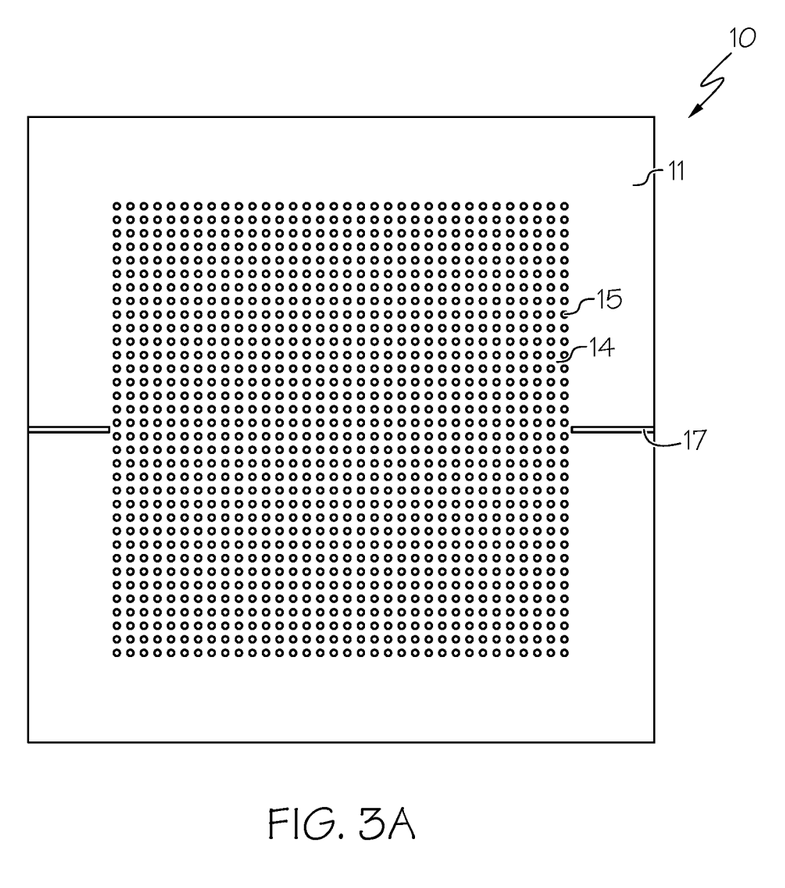
FIG. 3A is a top plan view of a first tooling member of the tooling assembly of FIG. 1.
Figure 3B:
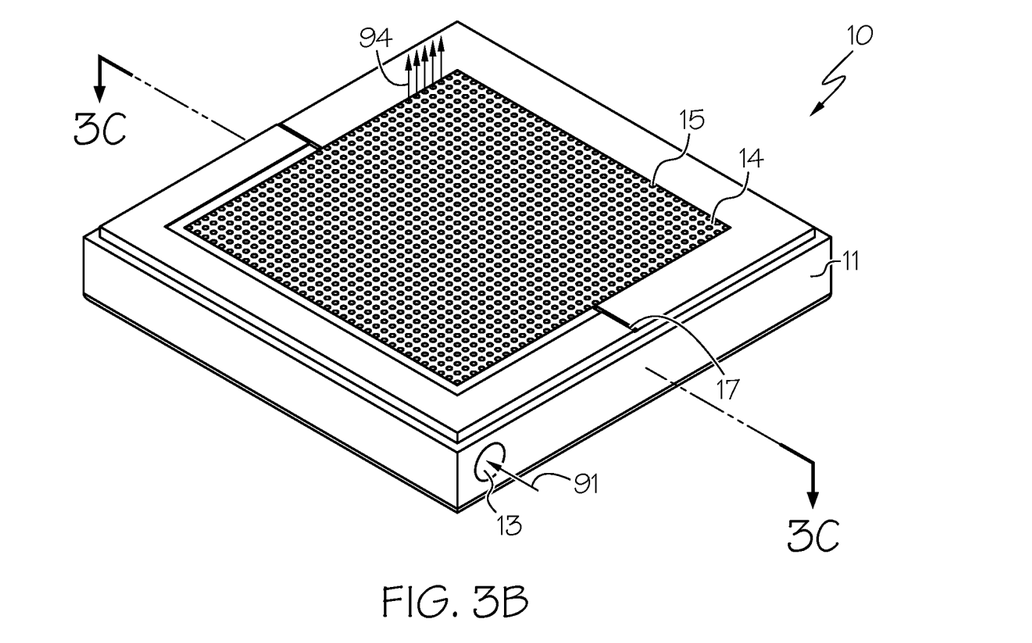
FIG. 3B is a perspective view of the first tooling member of FIG. 3A.

Referring to FIGS. 2, 3A and 3B, the first tooling member 10 includes a first body 11 that defines a first internal volume 12 and a first inlet 13. The first inlet 13 is fluidly coupled with the first internal volume 12. The first tooling member 10 also includes a first tooling surface 14 that defines a plurality of first perforations 15. The plurality of first perforations 15 are also fluidly coupled with the first internal volume 12. As such, the first inlet 13 is in fluid communication with the plurality of first perforations 15 through the first internal volume 12. In some examples, the first tooling surface 14 may be integral with the first body 11. In other examples, the plurality of first perforations 15 may be uniformly distributed across the first tooling surface 14.

Figure 4A:
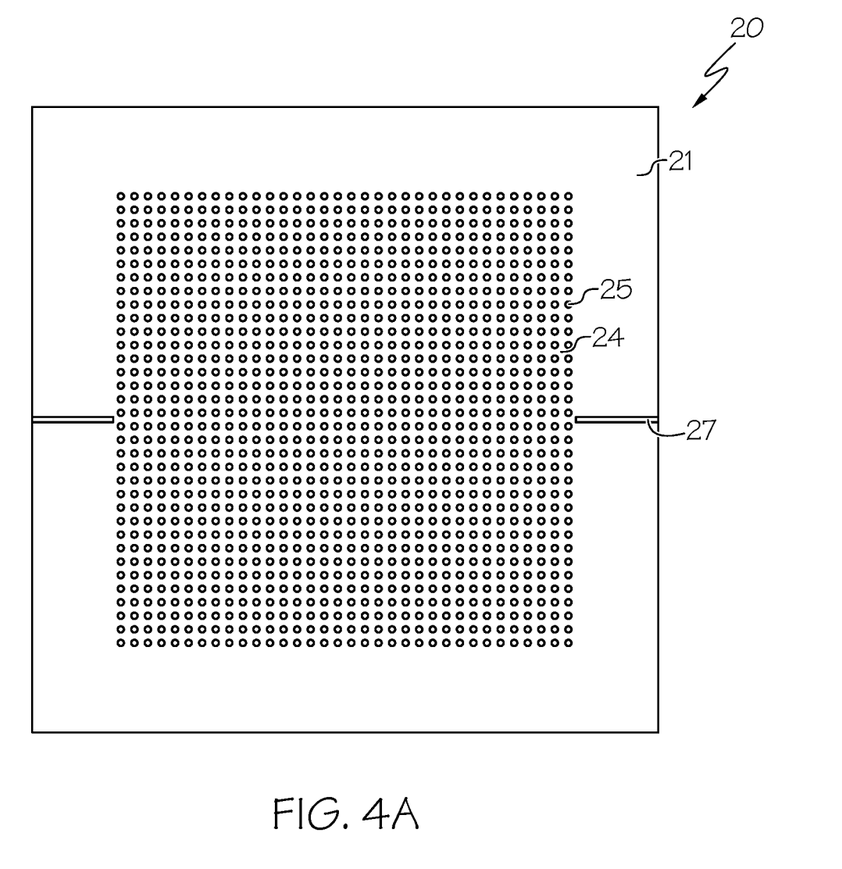
FIG. 4A is a top plan view of a second tooling member of the tooling assembly of FIG. 1.
Figure 4B:
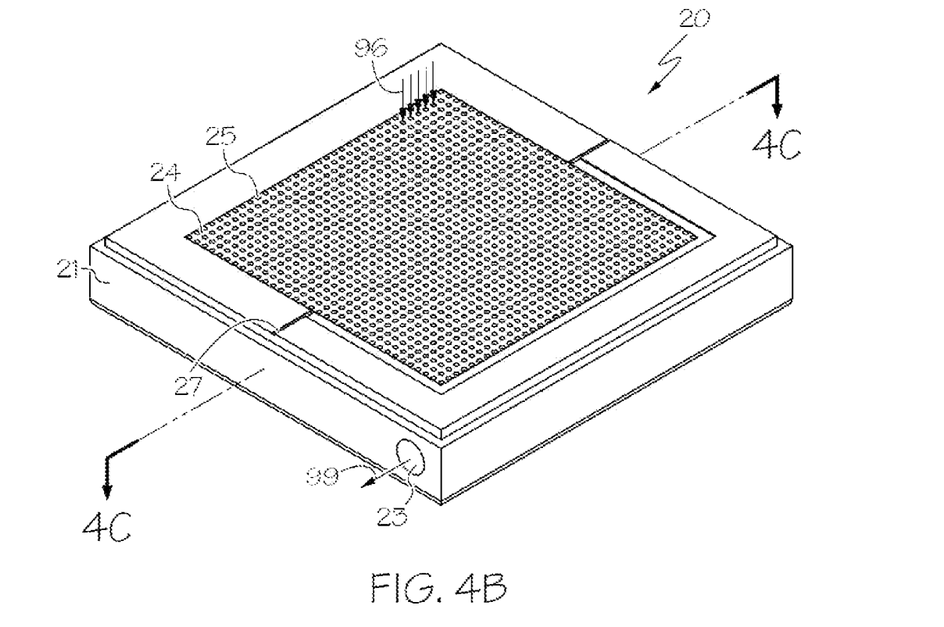
FIG. 4B is a perspective view of the second tooling member of FIG. 4A.

Still referring to FIG. 2, but further in reference to FIGS. 4A and 4B, the second tooling member 20 includes a second body 21 that defines a second internal volume 22 and a second inlet 23. The second inlet 23 is fluidly coupled with the second internal volume 22. The second tooling member 20 also includes a second tooling surface 24 that defines a plurality of second perforations 25. The plurality of second perforations 25 are also fluidly coupled with the second internal volume 22. As such, the second inlet 23 is in fluid communication with the plurality of second perforation 25 through the second internal volume 22. In some examples, the second tooling surface 24 may be integral with the second body 21. In other examples, the plurality of second perforations 25 may be uniformly distributed across the second tooling surface 24 such that they correspond with the plurality of first perforations 15.

Optionally, the first body 11 may define a first alignment feature 17 and the second body 21 may define a second alignment feature 27. The second alignment feature 27 may be sized and shaped to correspond with the first alignment feature 17. The first alignment feature 17 and the second alignment feature 27 may include, for example, ridges, notches or the like that encourage level and/or secure engagement between the first tooling member 10 and the second tooling member 20.

Figure 3C:
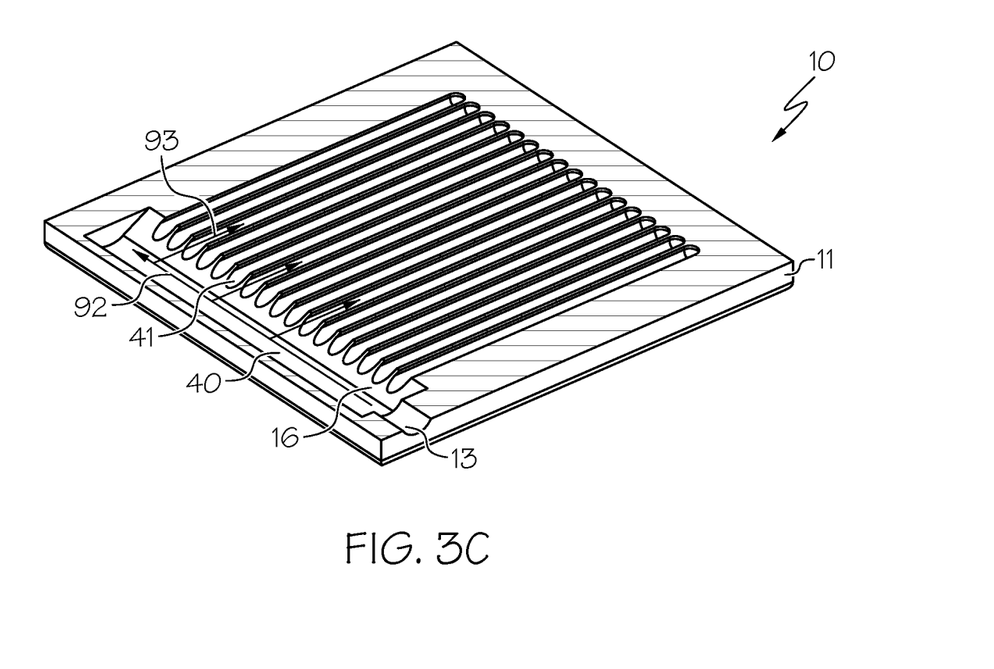
FIG. 3C is a perspective sectional view of the first tooling member of FIG. 3B.

A manifold system may be incorporated into or used in conjunction with the tooling assembly 30. The manifold system may include one or more manifolds. Turning now to FIG. 3C, which illustrates one example, the first tooling member 10 may include a first manifold 16 contained within the first internal volume 12. The first manifold 16 may be integral with the first body 11 (e.g., the first manifold 16 and the first body 11 may be a single monolithic body) and may include a primary channel 40 with a plurality of secondary channels 41 extending from the primary channel 40. In some examples, the secondary channels 41 may extend generally perpendicular relative to the primary channel 40. Further, this primary channel 40 may extend from, and be fluidly coupled with, the first inlet 13.

As shown by arrow 91 in FIG. 3B, a fluid may flow into the first tooling member 10 through the first inlet. As shown by arrows 92 and 93 in FIG. 3C, the fluid may then travel along the primary channel 40 and divide amongst the secondary channels 41. As shown by arrow 94 in FIG. 3B, the fluid may subsequently exit the first tooling member by flowing through the plurality of first perforations 15. In this way, the first manifold 16 distributes the fluid across the first internal volume 12 before the fluid flows through the plurality of first perforations.

Figure 4C:
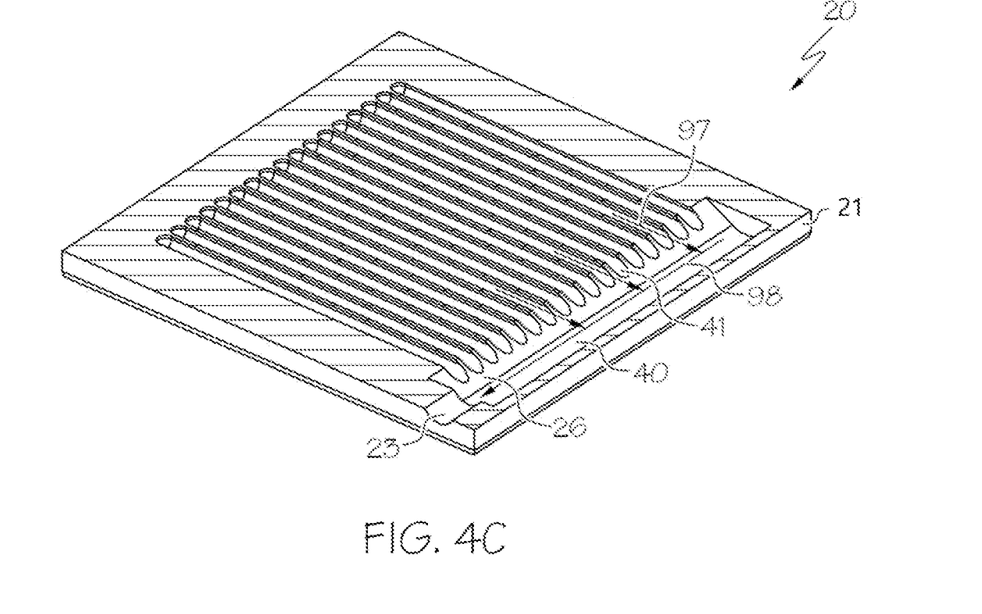
FIG. 4C is a perspective sectional view of the second tooling member of FIG. 4B.

Turning now to FIG. 4C, the second tooling member 20 may include a second manifold 26 contained within the second internal volume 22. The second manifold 26 may be integral with the second body 21 (e.g., the second manifold 26 and the second body 21 may be a single monolithic body) and may include a primary channel 40 with a plurality of secondary channels 41 extending from the primary channel 40. In some examples, the secondary channels 41 extend generally perpendicular relative to the primary channel 40. Further, this primary channel 40 may extend from, and be fluidly coupled with, the second inlet 23.

As shown by arrow 96 in FIG. 4B, fluid flowing from the first tooling member 10 may pass through the plurality of second perforations 25. As shown by arrows 97 and 98 in FIG. 4C, the fluid may then be received by the secondary channels 41 and accumulate in the primary channel 40. As shown by arrow 99 in FIG. 4B, the accumulated fluid may subsequently flow out of the second tooling member 20 through the second inlet 23. In this way, the second manifold 26 collects the fluid after the fluid has flowed through the plurality of second perforations 25.

In one particular implementation, the first tooling member 10 contains a first manifold 16 and the second tooling member 20 contains a second manifold 26. Those skilled in the art would appreciate that in this implementation, the two manifolds enable the even distribution of fluid across the first tooling surface 14 and the second tooling surface 24 as the fluid flows from the first tooling member 10 to the second tooling member 20.

Figure 8A:
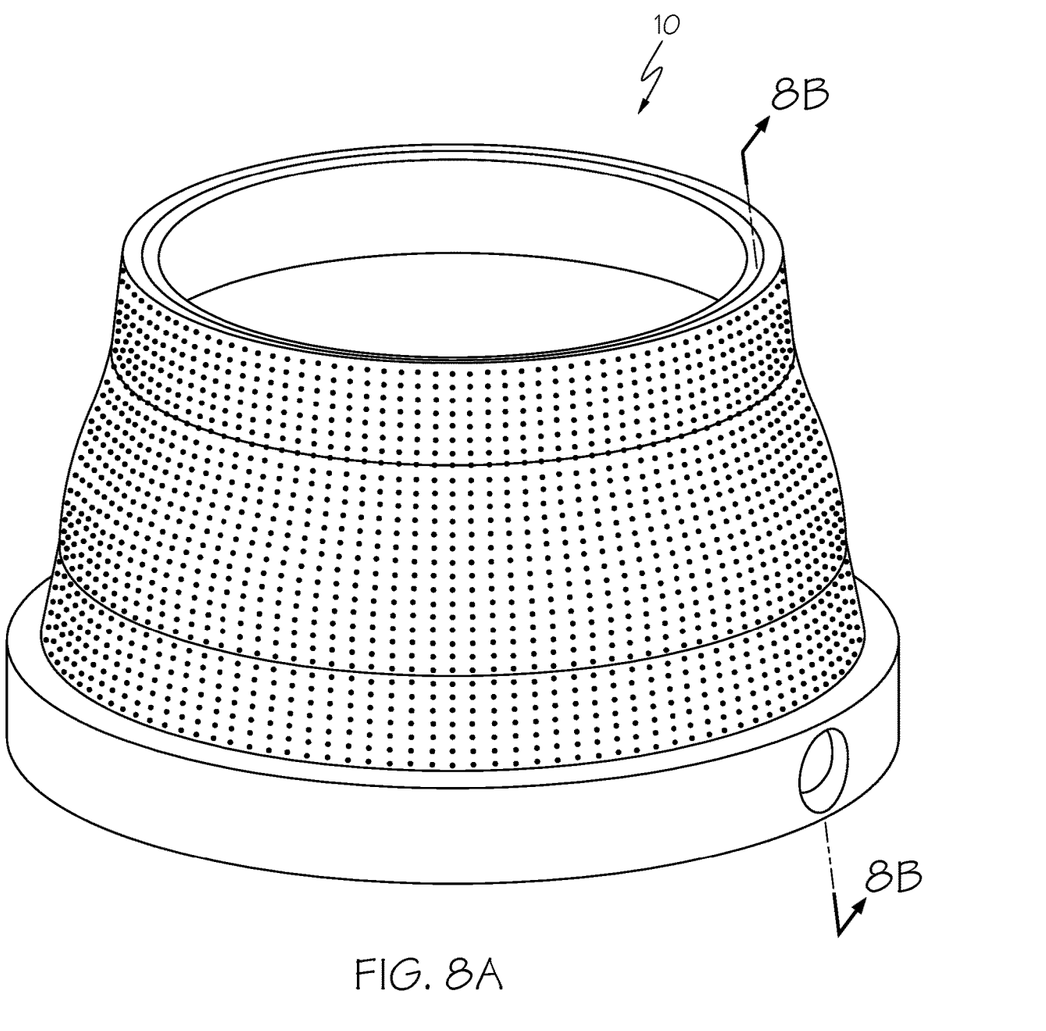
FIG. 8A is a perspective view of a first tooling member in accordance with another example of the disclosed tooling assembly.
Figure 8B:
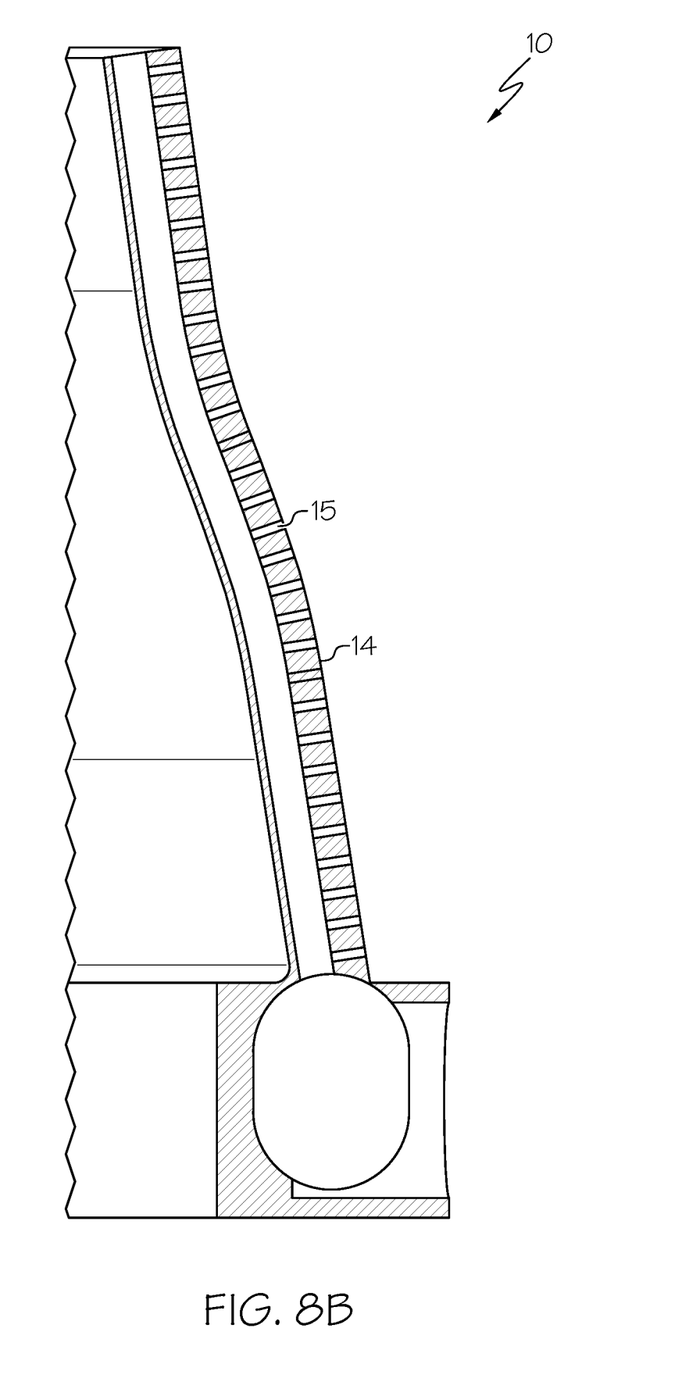
FIG. 8B is a side sectional view of a portion of the first tooling member of FIG. 8A.

As shown in FIGS. 8A and 8B, the first tooling surface 14 of the first tooling member 10 may have intricate, contoured shapes, while still including the first perforations 15. These intricate, contoured shapes may correspond to the desired shape of a finished porous composite structure. In one specific, non-limiting example, the first tooling surface 14 may have a cylindrical shape. In another specific, non-limiting example, the first tooling surface 14 may have a truncated cone shape. Those skilled in the art will appreciate that the second tooling surface 24 (FIG. 1) may have a contoured shapes closely corresponding to the contoured shape the first tool surface 14.

Figure 5:
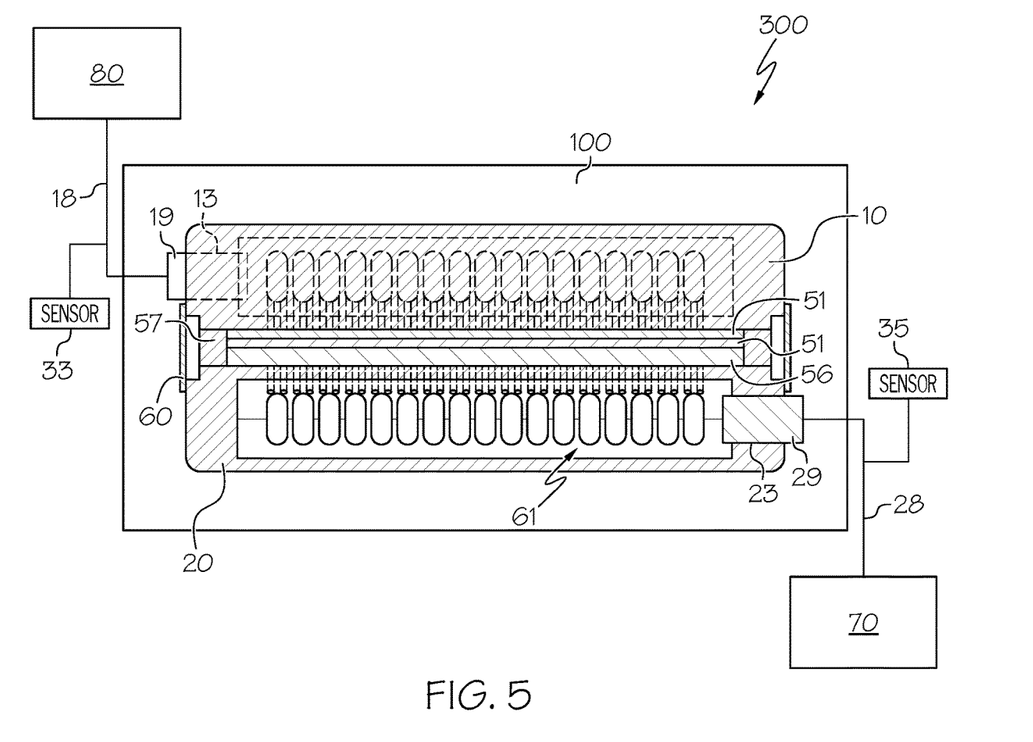
FIG. 5 is a side elevational view, in cross-section, of one example of the disclosed system for manufacturing a porous composite structure.

Referring to FIG. 5, illustrated is an example system 300 for manufacturing a porous composite structure. The system includes the tooling assembly 30 of FIG. 1 and a layup 50, which may be green/uncured (i.e., a green layup), positioned between the first tooling surface 14 of the first tooling member 10 and the second tooling surface 24 of the second tooling member 20.

The system may include a sealing member 60 that overlaps portions of the first tooling member 10 and the second tooling member 20. Once overlapped, the sealing member 60, the first tooling member 10 and the second tooling member 20 may define an airtight vacuum chamber 61 within which the layup 50 may be positioned and a flow of fluid (arrows 95 in FIG. 7) through the layup 50 may be established. The sealing member 60 may comprise at least one of a sealant tape and a vacuum bag. Those skilled in the art will appreciate that other methods of sealing may be used without departing from the scope of the present disclosure.

Still referring to FIG. 5, the system 300 may include a fluid source 80. The fluid source 80 may be, for example, atmospheric air or an inert gas such as pressurized nitrogen. The fluid source 80 may be fluidly coupled with the first inlet 13 of the first tooling member 10. A first fluid line 18 may be used to connect the fluid source 80 to the first inlet 13 and a first coupling 19 may be used to securely attach the first fluid line 18 to the first inlet 13.

The system 300 may include a fluid movement device. Still referring to FIG. 5, the fluid movement device may include a vacuum source 70. The vacuum source 70 may be fluidly coupled with the second inlet 23 of the second tooling member 20. A second fluid line 28 may be used to connect the vacuum source 70 to the second inlet 23 and a second coupling 29 may be used to securely attach the second fluid line 28 to the second inlet 23.

In one particular implementation, the system 300 contains both a fluid source 80 and a vacuum source 70. Those skilled in the art would appreciate that in this implementation, the vacuum source 70 pulls fluid from the fluid source 80 which thereby establishes a flow of fluid through the system 300 (e.g., arrows 91-99 as shown in FIGS. 3B, 3C, 4B, 4C and 7).

Optionally, the fluid movement device may include a blower system in fluid communication with the fluid source 80. The blower system may introduce fluid into the tooling assembly 30 and establish a flow of fluid therein. In one example, the blower system may be used in conjunction with the vacuum source 70. In another example, the blower system may be used as an alternative to the vacuum source 70.

Optionally, the system 300 may also include a recirculation system for recapturing fluid once the fluid has flowed through the tooling assembly 30. The recirculation system may be in fluid communication with the vacuum source 70 and may further include a resin trap for filtering the recaptured fluid before the recaptured fluid is reintroduced back into the fluid source 80.

Optionally, a sensor 33, such as a pressure sensor, a flowmeter or the like, may be positioned on or near the first fluid line 18 to sense the fluid within the first fluid line 18 and/or a sensor 35, such as a pressure sensor, a flowmeter or the like, may be positioned on or near the second fluid line 28 to sense the fluid within the second fluid line 28 The sensors 33, 35 may provide an indication as to whether fluid is flowing (Block 260 in FIG. 9) through the layup 50 as the layup 50 is being heated (Block 270 in FIG. 9) to cure (or consolidate) the layup 50.

The layup 50 may generally be composed of multiple plies 51. The layup may also be connected to a core layer 56. For example, the layup 50 may include three plies 51. In another example, the layup 50 may include multiple plies 51 laid on top of a core layer 56 (e.g., honeycomb). In yet another example, there may be multiple plies 51 laid on both major sides of a core layer 56 (e.g., a sandwich structure). Those skilled in the art will appreciate that other composite materials and layup arrangements may be utilized without departing from the scope of the present disclosure.

Figure 6:
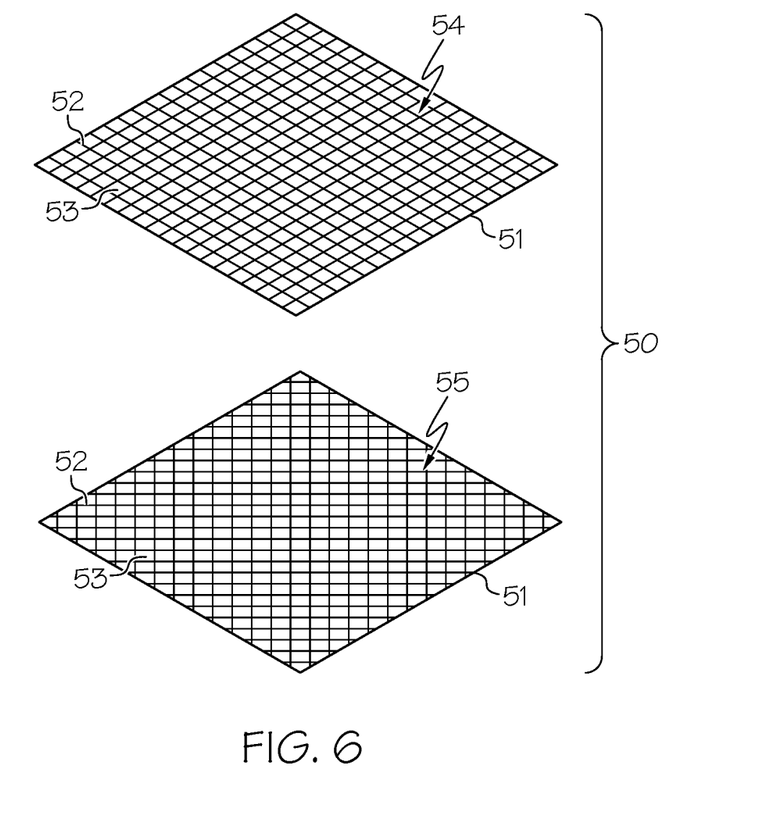
FIG. 6 is an exploded perspective view of a plurality of plies of the system of FIG. 5.
Figure 7:
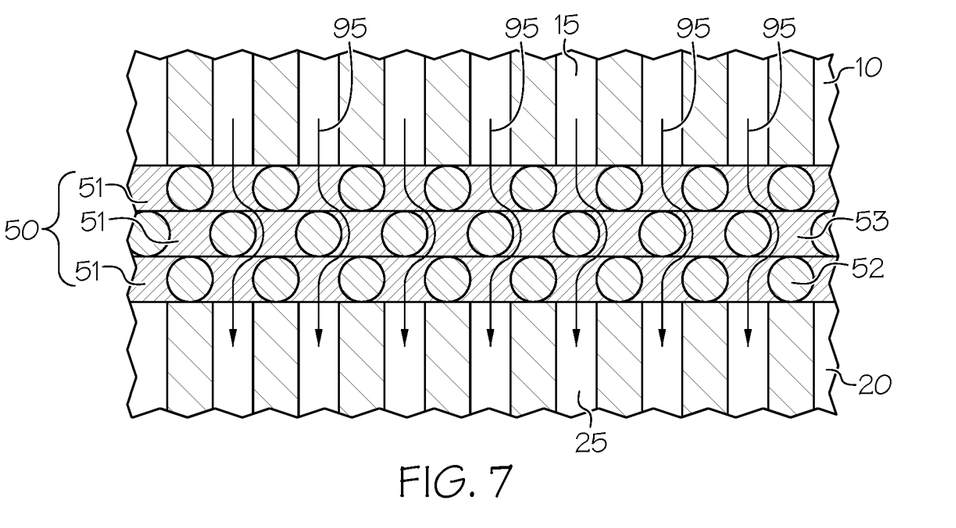
FIG. 7 is a schematic side elevational view depicting the flow of fluid through the system of FIG. 5.

As shown in FIGS. 6 and 7, one suitable type of ply 51 for use in the layup 50 is prepreg, i.e., reinforcing fibers 52 embedded in a resin matrix 53. The resin matrix 53 may comprise a thermosetting resin or a thermoplastic resin. Further, the individual plies 51 may be stacked in varying orientations as defined by their reinforcing fibers. As shown in FIG. 6, one ply may by laid in a 0°-90° first fiber orientation 54 and another ply may be laid in a −45°-45° second fiber orientation 55, resulting in the first fiber orientation 54 being approximately 45° offset from the second fiber orientation 55.

As shown in FIG. 5, a fairing bar 57 may also be positioned between the first tooling member 10 and the second tooling member 20. The fairing bar 57 may be approximately equal to the cross-sectional thickness of the layup 50 and may fit around the perimeter of the layup 50 when positioned between the first tooling member 10 and the second tooling member 20. When the tooling assembly 30 is used with a vacuum source 70, the vacuum source 70 establishes a pressure differential across the layup 50. A fairing bar 57 positioned between the first tooling member 10 and the second tooling member 20 would prevent the layup 50 from being crushed. Those skilled in the art will appreciate that different fairing bars may be used throughout the manufacturing process to accommodate changes in the layup 50 as it becomes a porous composite structure or to account for any additional plies that may be added to it. Those skilled in the art will also appreciate that there may be instances in which a fairing bar is not needed.

Still referring to FIG. 5, the system 300 may further include an insulated chamber 100 that the tooling assembly 30 containing the layup 50 may be placed within. The insulated chamber 100 may heat the tooling assembly 30 and thereby cure the layup 50. As such, pores may be created in the layup 50 using the tooling assembly 30 while curing in the insulated chamber 100. The insulated chamber 100 may comprise at least one of an oven and an autoclave.

Referring to FIG. 7, by flowing fluid through the first perforations 15, through the layup 50 and through the second perforations 25, the fluid displaces resin matrix 53 located between the reinforcing fibers 52 of each ply 51, thereby creating pores in the layup 50. It is contemplated that the displaced resin matrix may be shifted around each ply or between them to accommodate the flow of fluid (arrows 95 in FIG. 7). It is also contemplated that the displaced resin matrix may become dislodged and be carried along with the flow of fluid (arrows 95 in FIG. 7). The displaced resin matrix may be deposited in the core layer 56, the second tooling member or may be carried into the vacuum source.

Further, due to the nonuniform positioning of the reinforcing fibers 52, the path created by the fluid through the layup 50 is defined by its tortuosity. Without being limited to any particular theory, it is believed that such tortuous paths enable the porous composite structure to attenuate sound. It is further believed that a porous composite structure manufactured according to the present disclosure can exhibit an acoustic resistance substantially equal to traditional drilled facesheets bonded to a septumized honeycomb core layer 56. In contrast to the perforations in traditional drilled facesheets, the pores created in accordance with the present disclosure will not be as straight nor will they have a uniformly circular cross section.

Figure 9:
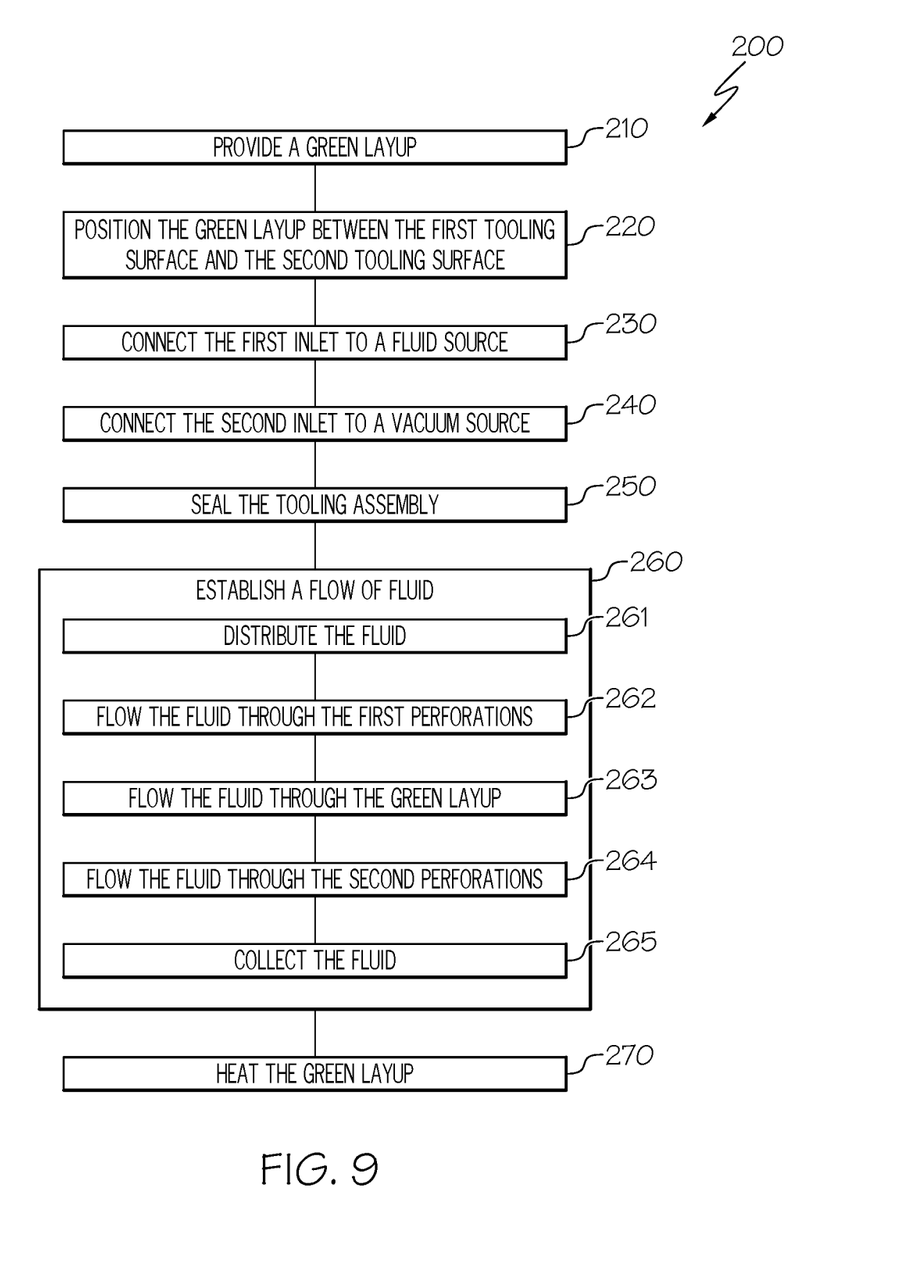
FIG. 9 is a flow diagram of one example of the disclosed method for manufacturing a porous composite structure.

Referring to FIG. 9, disclosed is a method, generally designated 200, for manufacturing a porous composite structure using the tooling assembly 30 of FIG. 1. As shown at Blocks 210 and 220, a layup 50, which may be green/uncured (i.e., a green layup), is provided and then positioned between the first tooling surface 14 of the first tooling member 10 and the second tooling surface 24 of the second tooling member 20. The first tooling member 10 and the second tooling member hold the layup in a fixed position and help to prevent any bending or distortion that may occur in the layup 50 during the manufacturing process. A flow of fluid is then established (Block 260) from the first tooling member 10 into the second tooling member 20 wherein the fluid flows (Blocks 262-264) through the first perforations 15, through the layup 50, and through the second perforations 25 (e.g., arrows 94 and 96 in FIGS. 3B, 4B and 7).

As shown in Blocks 230 and 240, the first inlet 13 of the first tooling member 10 may be connected to a fluid source 80 and the second inlet 23 of the second tooling member 20 may be connected to a vacuum source 70. In this way, the vacuum source 70 may be used to establish a flow of fluid from the fluid source 80 (e.g., arrows 91-99 as shown in FIGS. 3B, 3C, 4B, 4C and 7). Those skilled in the art will appreciate that other methods of establishing a flow of fluid may be used without departing from the scope of the present disclosure. Those skilled in the art will also appreciate that the order of connecting a fluid source 80 and a vacuum source 70 is interchangeable.

Referring to Block 250, the tooling assembly 30 may be sealed prior to the step (Block 260) of establishing the flow of fluid (e.g., arrows 91-99 as shown in FIGS. 3B, 3C, 4B, 4C and 7). Sealing the tooling assembly 30 may prevent outside fluid from entering the system 300 which may diminish the unidirectional flow of fluid through the layup 50.

Turning now to Block 260, the step of establishing a flow of fluid may further include the step (Block 261) of distributing the fluid prior to flowing the fluid through the first perforations 15 (e.g., arrows 91-94 in FIGS. 3B and 3C) and the step (Block 265) of collecting the fluid after the fluid has flowed through the second perforations 25 (e.g., arrows 96-99 in FIGS. 4B and 4C). In one expression, the fluid is distributed using a first manifold 16 contained within the first internal volume 12 of the first tooling member 10. In another expression, the fluid is collected using a second manifold 26 contained within the second internal volume 22 of the second tooling member 20. In yet another expression, the fluid is distributed using a first manifold 16 contained within the first internal volume 12 of the first tooling member 10 and then collected using a second manifold 26 contained within the second internal volume 22 of the second tooling member 20. Those skilled in the art will appreciate that other methods, devices or structures may be used to distribute and/or collect the fluid without departing from the scope of the present disclosure.

Referring now to Block 270, the layup 50 is heated concurrently with the step (Block 260) of establishing the flow of fluid (e.g., arrows 91-99 as shown in FIGS. 3B, 3C, 4B, 4C and 7). In other words, the heating (Block 270) occurs simultaneously with the step (Block 260) of establishing the flow of fluid. The heating step (Block 270) may occur by placing the tooling assembly 30 into an insulated chamber 100, such as an oven or an autoclave, and heating the tooling assembly 30 to a predetermined temperature while fluid is flowing (Block 260) through the layup 50. In one implementation, the predetermined temperature may correspond to a cure temperature of the layup 50 (e.g., for a layup 50 comprising a thermosetting resin matrix 53 (FIG. 7)). In another implementation, the predetermined temperature may correspond to a consolidation temperature of the layup 50 (e.g., for a layup 50 comprising a thermoplastic resin matrix 53 (FIG. 7)). In alternative aspects, the heating step (Block 270) may occur either before and/or after the step (Block 260) of establishing a flow of fluid.

Figure 10:
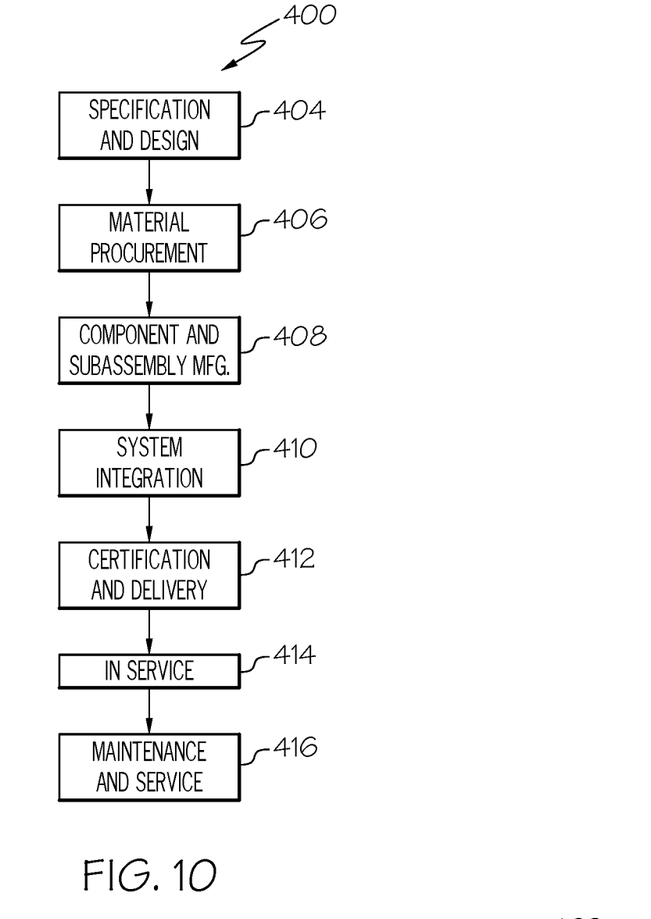
FIG. 10 is a flow diagram of an aircraft manufacturing and service methodology.
Figure 11:
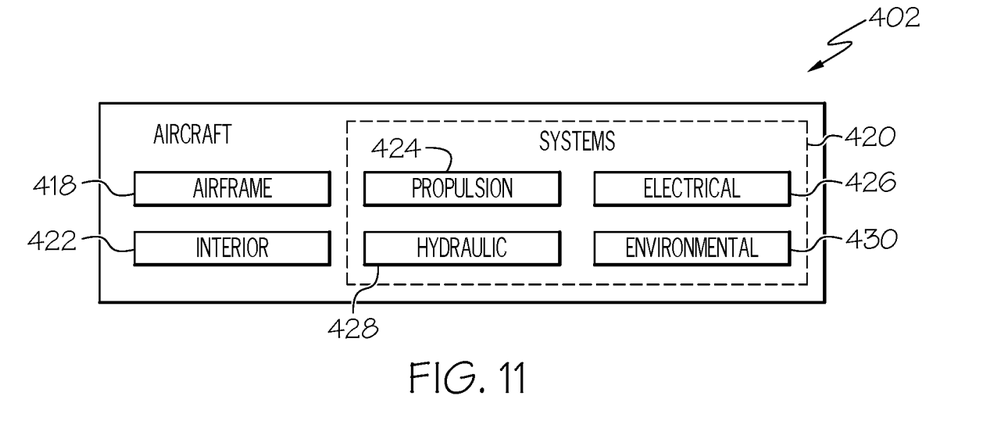
FIG. 11 is a block diagram of an aircraft.

Examples of the disclosure may be described in the context of an aircraft manufacturing and service method 400, as shown in FIG. 10, and an aircraft 402, as shown in FIG. 11. During pre-production, the aircraft manufacturing and service method 400 may include specification and design 404 of the aircraft 402 and material procurement 406. During production, component/subassembly manufacturing 408 and system integration 410 of the aircraft 402 takes place. Thereafter, the aircraft 402 may go through certification and delivery 412 in order to be placed in service 414. While in service by a customer, the aircraft 402 is scheduled for routine maintenance and service 416, which may also include modification, reconfiguration, refurbishment and the like.

Each of the processes of method 400 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 11, the aircraft 402 produced by example method 400 may include an airframe 418 with a plurality of systems 420 and an interior 422. Examples of the plurality of systems 420 may include one or more of a propulsion system 424, an electrical system 426, a hydraulic system 428, and an environmental system 430. Any number of other systems may be included.

The disclosed tooling assembly, system and method for manufacturing a porous composite structure may be employed during any one or more of the stages of the aircraft manufacturing and service method 400. As one example, the disclosed tooling assembly, system and method for manufacturing a porous composite structure may be employed during material procurement 406. As another example, components or subassemblies corresponding to component/subassembly manufacturing 408, system integration 410, and or maintenance and service 416 may be fabricated or manufactured using the disclosed tooling assembly, system and method for manufacturing a porous composite structure. As another example, the airframe 418 and the interior 422 may be constructed using the disclosed tooling assembly, system and method for manufacturing a porous composite structure. Also, one or more apparatus examples, method examples, or a combination thereof may be utilized during component/subassembly manufacturing 408 and/or system integration 410, for example, by substantially expediting assembly of or reducing the cost of an aircraft 402, such as the airframe 418 and/or the interior 422. Similarly, one or more of system examples, method examples, or a combination thereof may be utilized while the aircraft 402 is in service, for example and without limitation, to maintenance and service 416.

The disclosed tooling assembly, system and method for manufacturing a porous composite structure are described in the context of an aircraft; however, one of ordinary skill in the art will readily recognize that the disclosed tooling assembly, system and method for manufacturing a porous composite structure may be utilized for a variety of applications. For example, the disclosed tooling assembly, system and method for manufacturing a porous composite structure may be implemented in various types of vehicles including, e.g., helicopters, passenger ships, automobiles and the like.

Although various examples of the disclosed tooling assembly, system and method for manufacturing a porous composite structure have been shown and described, modifications may occur to those skilled in the art upon reading the specification. The present application includes such modifications and is limited only by the scope of the claims.

What is claimed is:

1. A system for manufacturing a porous composite structure comprising:
   a green layup comprising reinforcing fibers embedded in a resin matrix;
   a tooling assembly configured to receive said green layup and comprising:
      a first tooling member comprising:
         a first body that defines a first internal volume;
         a first inlet fluidly coupled with said first internal volume;
         a first tooling surface configured to contact a first side of said green layup;
         a plurality of first perforations formed through the first tooling surface and fluidly coupled with said first internal volume; and
         a first manifold situated in the first internal volume and configured to evenly distribute fluid across said first tooling surface; and
      a second tooling member opposed from said first tooling member, said second tooling member comprising:
         a second body that defines a second internal volume;
         a second inlet fluidly coupled with said second internal volume;
         a second tooling surface configured to contact a second side of the green layup; and
         a plurality of second perforations formed through the second tooling surface and fluidly coupled with said second internal volume;
   a fluid movement device fluidly coupled with at least one of said first inlet of said first tooling member and said second inlet of said second tooling member and configured to generate a flow said fluid between the first tooling member and the second tooling member;
   a sensor configured to detect said flow of said fluid; and
   a heating chamber configured to receive said tooling assembly and to heat said first tooling member and said second tooling member to a temperature sufficient to cure said green layup positioned between said first tooling surface of said first tooling member and said second tooling surface of said second tooling member,
   wherein said fluid movement device continuously moves said fluid from said first plurality of first perforations, through said green layup, and to said second plurality of second perforations at a sufficient pressure to displace a portion of said resin matrix between a portion of said reinforcing fibers to yield a plurality of tortuous paths in said green layup while said green layup is being cured by conductive heating from said first tooling member and said second tooling member.

2. The system of claim 1 further comprising a sealing member that overlaps portions of said first tooling member and said second tooling member.

3. The system of claim 2 wherein said sealing member comprises at least one of a sealant tape and a vacuum bag.

4. The system of claim 2 wherein said sealing member, said first tooling member, and said second tooling member define an airtight vacuum chamber.

5. The system of claim 1 further comprising a fluid source fluidly coupled to said fluid movement device.

6. The system of claim 5 wherein said fluid source comprises inert gas.

7. The system of claim 1 further comprising a first fluid line that fluidly couples said first inlet with said fluid movement device.

8. The system of claim 7 further comprising a first coupling that fluidly couples said first inlet with said first fluid line.

9. The system of claim 1 wherein said fluid movement device comprises at least one of a blower fluidly coupled with said first inlet of said first tooling member and a vacuum fluidly coupled with said second inlet of said second tooling member.

10. The system of claim 1 further comprising a second fluid line that fluidly couples said second inlet with said fluid movement device.

11. The system of claim 10 further comprising a second coupling that fluidly couples said second inlet with said second fluid line.

12. The system of claim 1 wherein said insulated chamber is one of an oven and an autoclave.

13. The system of claim 1 wherein said green layup comprises a plurality of plies.

14. The system of claim 13 wherein the resin matrix comprises a thermosetting resin.

15. The system of claim 13 wherein the resin matrix comprises a thermoplastic resin.

16. The system of claim 13 wherein:
one ply of said plurality of plies comprises a first fiber orientation; and
another ply of said plurality of plies comprises a second fiber orientation that is different from said first fiber orientation.

17. The system of claim 16 wherein said first fiber orientation is approximately 45° offset from said second fiber orientation.

18. The system of claim 13 wherein said green layup further comprises a core layer connected to at least one ply of said plurality of plies.

19. The system of claim 1 further comprising a fairing bar positioned between said first tooling member and said second tooling member.

20. The system of claim 1 wherein fluid movement device establishes a pressure differential across said green layup.

21. A porous composite structure manufactured using the system of claim 1.

22. The system of claim 1, wherein the plurality of tortuous paths enable the porous composite structure to attenuate sound.

23. The system of claim 5 wherein said fluid source is atmospheric air.

24. The system of claim 19, wherein said fairing bar has a thickness equal to a cross-sectional thickness of said green layup and is situated around a perimeter of said green layup.

* * * * *